…

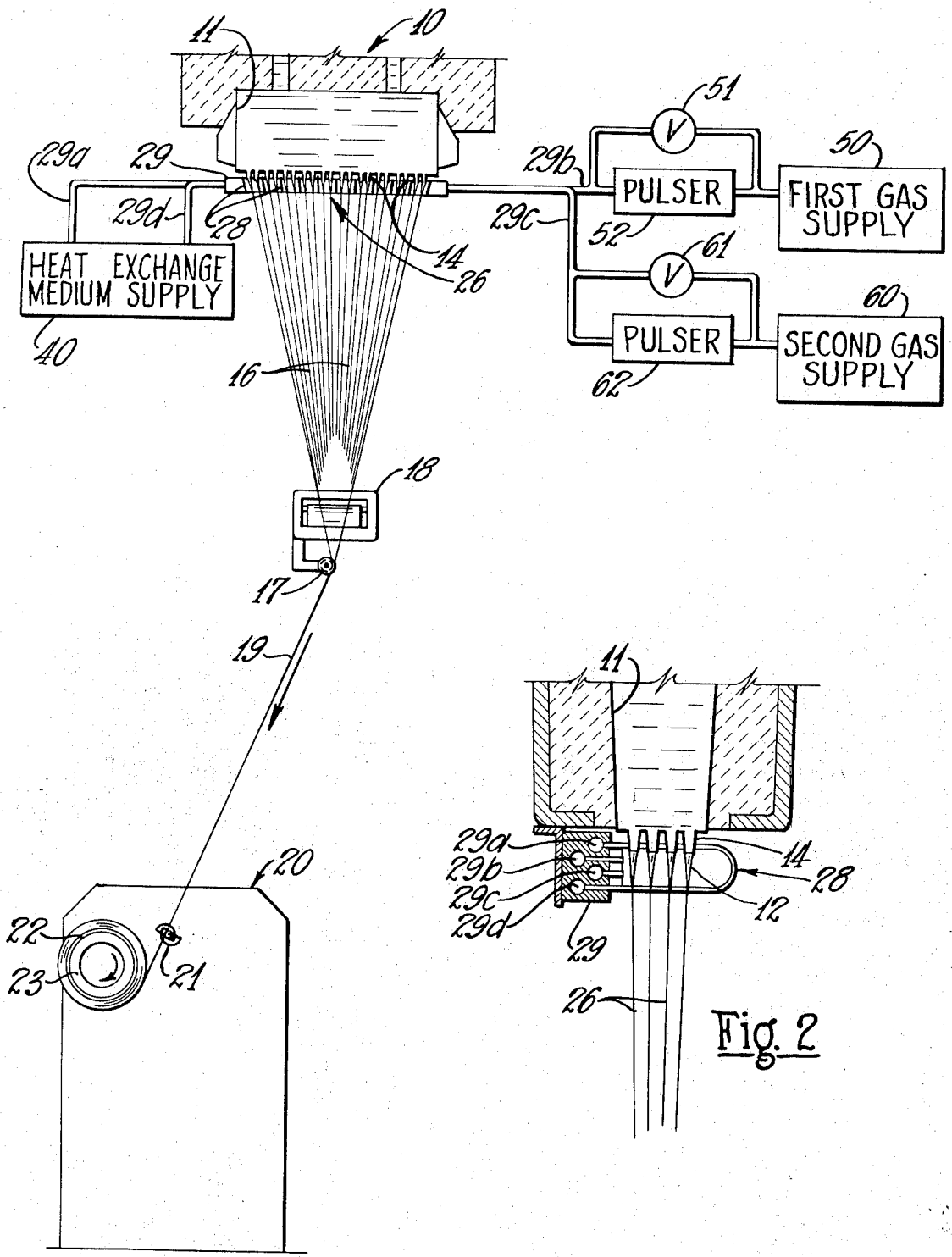

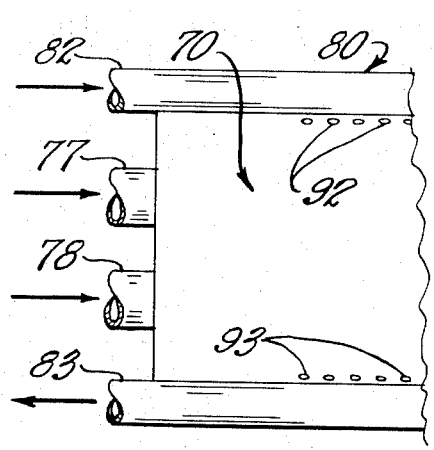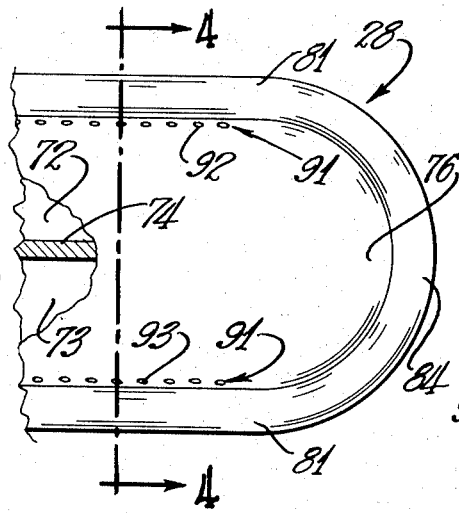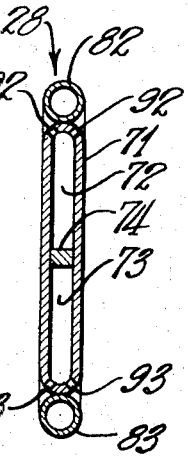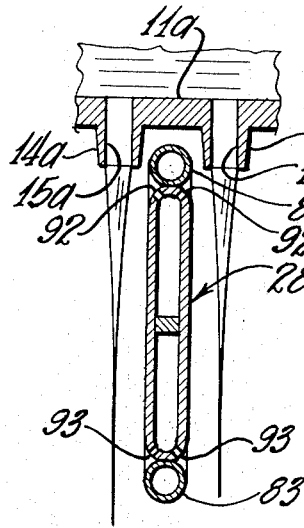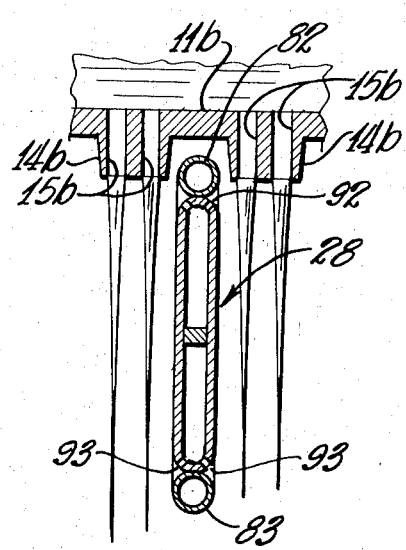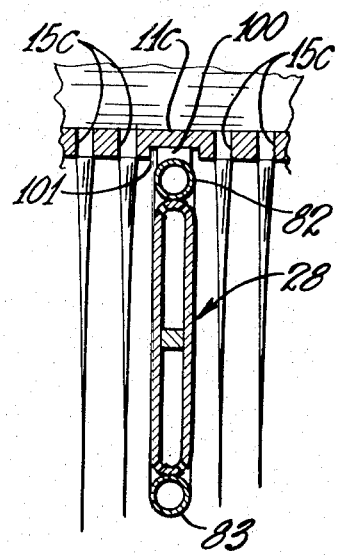

United States Patent Office 3,695,858
Patented Oct. 3, 1972

3,695,858
METHOD AND APPARATUS FOR PRODUCTION OF GLASS FIBERS
Robert G. Russell, Granville, Ohio, assignor to Owens-Corning Fiberglas Corporation
Continuation of application Ser. No. 82,077, Oct. 19, 1970, which is a continuation of application Ser. No. 759,278, Sept. 12, 1968, both now abandoned. This application Oct. 29, 1971, Ser. No. 193,964
Int. Cl. C03b 37/10
U.S. Cl. 65—2   31 Claims

ABSTRACT OF THE DISCLOSURE

Method and apparatus for producing filaments of heat-softenable material including a feeder for feeding material in molten form, the feeder having orifices from which streams of material flow. The streams are attenuated into filaments in an attenuation zone adjacent the feeder. Gaseous material for controlling or altering the environment is released into the zone of attenuation of the stream. The temperature of the gaseous material is controlled in the attenuation zone before release by conducting a heat-exchange medium in heat exchange relationship with the gaseous material in the attenuation zone.

---

This is a continuation of my co-pending application Ser. No. 82,077, filed Oct. 19, 1970, which was a continuation of my then co-pending application Ser. No. 759,278, filed Sept. 12, 1968, and now both abandoned.

The invention is herein exemplified by reference to the production of continuous glass fibers wherein streams of molten glass are attenuated mechanically into continuous fibers or filaments of small diameter and then grouped into a strand and wound into a package.

In greater detail, this process of producing continuous fibers of glass involves flowing streams of molten glass from orifices of an electrically heated bushing or feeder associated with a container reservoir in which the material is reduced to a molten condition. The orifices may be formed in projecting tips, nipples or ridges from which heat of the glass is dissipated as it flows in the form of streams therefrom, in the apex of a V-shaped feeder and in other structural arrangements such as a flat plate feeder made of an alloy which is non-wetting in the presence of the specified gases. Specific embodiments are disclosed and discussed herein.

Upon emission to the atmosphere the streams of glass each neck down, as determined by the viscosity and surface tension, to form a cone-like body of the glass which is attenuated to its final diameter. The cohesive forces which transmit the attenuation from the fiber to the body of the cone are closely related to the viscosity of the glass. Surface tension of the glass also contributes to the transfer of forces over the periphery of the cone, but, in addition, acts to bring about constriction of the stream into a conical configuration. As the temperature of the melt increases the viscosity of the fluid from which the fiber is made is lowered and eventually it reaches a point where it offers little resistance and the surface tension will actually constrict the material into beads or droplets instead of flowing as a continuous stream. A high viscosity in such fluid, on the other hand, offers higher resistance and slows the constricting forces to such an extent that the viscosity of the fluid is a major factor in determining stability in the fiber-forming zone.

Taking these facts into consideration, it can be seen that if the viscosity of a given glass emitted from an orifice to a forming cone is too high, the tension required to be applied to the fibers to effect attenuation of the cone can be so high as to result in breakage of the fiber. At the more fluid end of the viscosity range, however, the glass flows more freely and the balance against surface tension becomes somewhat indefinite, which causes a form of pumping action or dancing movement of the cones at the fiber tips. The further lowering of the viscosity of the glass results in an approach towards constriction by the surface tension to the extent that discontinuous separate droplets of the fluid are formed.

A range of viscosities therefore exists within which fiberization of the glass can be accomplished but above and below which fibers are difficult or impossible to produce.

Apparatus has been introduced to the art in which water-cooled shield members are disclosed for disposition immediately adjacent the fiber-forming cones in non-contacting relation with the feeder to absorb heat from the cones by way of radiation absorption and to divide the total number of tips and their respective cones into smaller groups. The shield members shield the environment of the tips or orifices and the fiber-forming cones emitted therefrom against extraneous turbulences of the atmosphere outside the zone of fiber formation. The presence of such cooled shield members have made it possible to extend the viscosity range to permit fiberization of glass heated to a higher temperature than could have otherwise been fiberized by fluid emitted in an unshielded fiber-forming zone. The fact that the melt can thereby raise to a higher temperature also permits production of fibers of greater uniformity and permits fiberization of glasses which previously were not fiberizable while at the same time making operating conditions less critical to temperature variations due to turbulences in the surrounding atmosphere. By provision of cooled shield members in the zone of fiber formation, the rate of cooling of the glass emitted from the feeder is not left to the variant condition of the atmosphere but provides a greater control of the rate of cooling and makes the conditions of fiber formation more certain.

An additional feature which resulted from the adoption of shield members for fiber-forming operations was the increase in the number of rows of tips in a given feeder from which fibers could be attenuated. Previously the number of rows in a given feeder were limited to adjacent rows because if an additional third row were included in a feeder the center row would be so high in temperature from energy radiated to the center row of tips from the outside rows that the glass emitted therefrom would be so fluid as not to allow stable formation of fibers. With the presence of shield members, however, the number of rows could be increased to many more. The increased number of rows are highly desirable because the length of the feeder can be greatly reduced for a given number of fibers to be produced, correspondingly reducing the amount of precious metal such as platinum which is usually used in glass fiber feeder construction.

One difficulty presented in the use of such shield constructions in association with glass fiber feeders was that in a matter of hours during periods of constant operation of fiber-forming units, volatile materials emitted by the molten glass were deposited over the shield member surfaces adjacent the cones so that after a period the shield constructions were required to be cleaned in order to make them fully effective again. In more recent advances there has been disclosed a fin-shield structure for fiber-forming units wherein the cooled surfaces adjacent each fiber-forming cone are pervious, or in other words gas permeable, and are retained in cooled condition by passage of air therethrough, the air being effective both to provide the cooling for the heat absorption required and at the same time helping to clean the member by conveying away particles which might tend to deposit upon the surface. In this structure air alone was conducted through the fin-shield.

The series of hollow longitudinal gas permeable members discussed in the preceding paragraph have been utilized to conduct fixed quantities of vaporizable fluid in the zone of attenuation of the streams in locations between the streams. The liquid in the tubes is continuously transformed into gas within the tube to absorb heat by such transformation and to provide an atmosphere in the zone composed at least partly of the gas evolving through the gas permeable walls of the hollow, gas permeable members carrying the liquid. The fixed quantities of liquid within each hollow member are replenished at a rate matched directly to the rate of consumption of the liquid from the quantity as it is transformed into the gas within the hollow member. Heat removal from the fiber-forming zone is thus accomplished by radiation absorption by the shield members themselves, by convection removal of heat with induced air and gases emitted through the permeable walls of the shield member and, in addition, by absorption of heat in transforming the contained liquid to gases.

Although air is above described as the gas used to effect continuous cleaning and cooling of the pervious shield members, it will be recognized that other gases can also be used for such purposes. It has further been discovered that certain gases coat or "plate" the feeder area adjacent the orifices thereby preventing wetting of the glass and flooding of the feeder surface adjacent and between the orifices with molten glass. Flooding interferes with the formation of the cones and the attenuation of fine filaments. These gases are useful both with the flat-plate type of feeder and the feeders having projections therefrom in which orifices are formed. There have been problems encountered in the utilization of such gases in the attenuation zone or fiber-forming area, however, since many of the gases useful for such purposes will "break-down" under the influence of the heat in the area before their purpose can be accomplished. Methane and propane are examples of such a coating or "plating" gas which tends to be broken down by the heat in the environment of the attenuation zone. It is an object of this invention to provide method and means for preventing this break-down and for generally controlling the temperature of gases in the attenuation zone prior to their release in the zone.

It has been found that the mere circulation of gases through permeable conduits into the attenuation zone does not permit retaining control of the temperature of the gases that is desired for particular production techniques. This is true whether the gases are to be used for "plating" the feeder, treating the cones and filaments, cooling the feeder or cones, or a combination of these and other effects. The permeable conduits heat up in the attenuation zone and the passage therethrough of the gases is insufficient to overcome the absorption of heat by the gases. If sufficient quantities of the gases were passed through the fin structures, the velocity and quantity would have disruptive effects in the formation of filaments or fibers.

This invention provides a method and means of creating a desired environment in the attenuation zone by conducting a heat exchange medium in heat exchange relationship with the gases in the attenuation zone, before the gas is released in the zone. This may be accomplished by placing a medium carrying conduit in heat exchange relationship with a gas carrying conduit, either on the exterior or interior of the gas conduit. The cooling may be effected by placing a medium carrying conduit not only in heat exchange relationship with the gas conduit, but in a shielding relation between the gas conduit and the feeder.

Another benefit is obtained in the method and apparatus herein in that by the cooling of the gases in the attenuation zone a structure is obtained that has the ability to conduct more heat from the zone both from the gas and from the heat absorbed by the structure in radiation and convection effects from the cones and feeder. Therefore, the environment is under a more totally effective control.

This rapid heat and energy removal will further provide an improved temperature gradient along the fin structure so that cones along a row will be exposed to a fin structure that is more uniform in temperature throughout its length. In addition, the gas emitted from the fin structure assists in promoting the uniform temperature environment desired for cones along a row and across an orificed feeder surface to thereby promote uniformity in diameter and quality of the filaments formed from the cones.

In some production circumstances it is intended or desirable for a gas emitted in the upper portion of the attenuation zone, such as a gas for treating the feeder face or for the surface of the glass cone, to remain in the treatment area. This is difficult because of the natural "pumping" action of the fan of fibers as they are drawn downwardly by the attenuation means. Accordingly, it is an object of this invention to illustrate herein method and apparatus for providing a lower gaseous support to the treating gas introduced at the bushing face to maintain a gas pocket at the bushing face so that less treating gas is required, less is wasted, and less is pumped away to act as a contaminant in the area of the fiber-forming station. In addition to retaining a treating gas adjacent the bushing face, an input gas to form a gaseous support in the lower part of the attenuation zone may be made in sufficient quantity (or in excess of "fan" draft requirements) so that the fan will not be pumping or pulling contaminated air into the forming zone, the contaminated air usually carrying "fly" or other solid contaminates which contribute to breakouts of the very fine filaments being formed.

The gaseous support at the lower portion of the attenuation zone may be directionalized to provide physical stability to the lower portion or tip of the cone and the filament being formed therefrom in the direction of travel of the filament, thus preventing further disturbance with the filament forming process which may result from crosscurrents or drafts of ambient air below the normally shielded attenuation area.

It has been further discovered that when utilizing gas conduits for conducting a treating or cooling gas into the attenuating zone that a permeable mesh or passages formed in the conduit will eventually be blocked or obstructed by a deposition of volatiles on the conduit even though a continuous flow of gas is emitted therefrom. In the embodiments illustrated herein it has been discovered that further cleaning effects with respect to the fin may be obtained by pulsing the gas supply which is to be emitted from the fin to the attenuating zone. This pulsing, or change in velocity of the gas being emitted, acts to prevent obstruction of the mesh or air emission passages formed in the conduit. Pulsing also has the tendency to help reduce flooding. That is, it provides an additional anti-wetting force. For example, by using pulsation it is possible to use less protective gas and thus have less problems of room contamination, etc.

In addition it has been discovered that in the emission of a gaseous material adjacent the area surrounding the fiber orifice that a mixture of different gases, such as methane and air is useful in providing an even and constant temperature, a stable environment, and still provide the plating on the surfaces surrounding the orifice from which the glass emanates as discussed hereinbefore, the plating preventing the wetting of the surrounding surface with glass and the attendant bushing face flooding. This method permits the placing of the methane adjacent the feeder face in highly limited amounts, such as one part in one thousand, to preclude the ignition of the methane while still providing the plating effect desired. Other combinations include methane and carbon dioxide (or inert gases) or methane and combustion gases; or combustion products which exclude significant amounts of oxygen.

In view of the foregoing it is an object of the present invention to provide a more efficient, more economically operable shielding apparatus and method for fiber forming operations wherein fibers are attenuated from thermoplastic materials supplied from orificed feeders.

It is another object of the present invention to provide a method and means for the production of continuous fibers of glass wherein a treating or cooling gas may be introduced into the attenuation zone of the fibers, the temperature of the treating or cooling gas or gases being controlled in the attenuation zone prior to the release thereof.

It is a still further object of this invention to provide an improved method and means of environmental control in the production of continuous glass filaments.

Additionally, it is an object of this invention to provide an efficient means for shielding and absorbing heat from the immediate fiber-forming zone, in the production of continuous fibers from thermoplastic materials, the method and means permitting the utilization of cooling and/or treating gaseous materials by releasing such materials in the zone at predetermined temperatures to prevent their breakdown or to effect a predetermined treating or cooling.

In carrying out the above objects there is illustrated herein apparatus for producing filaments of heat-softenable material comprising a feeder for feeding such material in molten form having orifices from which streams of said material flow, means for continuously attenuating the streams to fine filaments in an attenuation zone adjacent the feeder, means for conducting gas into the zone of attenuation between the streams, the gas conducting means having outlet means for releasing gas into the zone of attenuation of the streams, and means for controlling the temperature of said gas before release including means for conducting a heat exchange medium in heat exchange relationship with the gas in the attenuation zone to remove heat from the gas to be released prior to its release.

The gas conducting means may include gas conduit means disposed in the attenuation zone. The medium conducting means may include medium conduit means disposed in heat exchange relationship adjacent the exterior of or in the interior of the gas conduit means in the zone of attenuation.

Other objects, advantages and features will become apparent when the following description is taken in conjunction with the accompanying drawings, in which:

FIG. 1 is a view of a general layout of apparatus including shielding components for the production of continuous glass fibers in accordance with the principles of the present invention;

FIG. 2 is an enlarged side elevational view partially in cross section, of the glass feeder and associated shield construction shown in FIG. 1;

FIG. 3 is an enlarged side elevational view of a first embodiment of a fin-shield structure of this invention;

FIG. 4 is a cross-sectional view of the structure of FIG. 3 taken at lines 4—4 of FIG. 3;

FIG. 5 is a cross-sectional view of a shield member illustrated in FIG. 3 shown in a preferred disposition with respect to a first embodiment of a feeder from which the fibers are drawn;

FIG. 6 is a cross-sectional view of the shield member illustrated in FIG. 3 shown in a preferred disposition with respect to a second embodiment of a feeder from which the fibers are drawn;

FIG. 7 is a cross-sectional view of the shield member illustrated in FIG. 3 shown in a preferred disposition with respect to a third embodiment of a feeder from which fibers are drawn;

Figure 8:
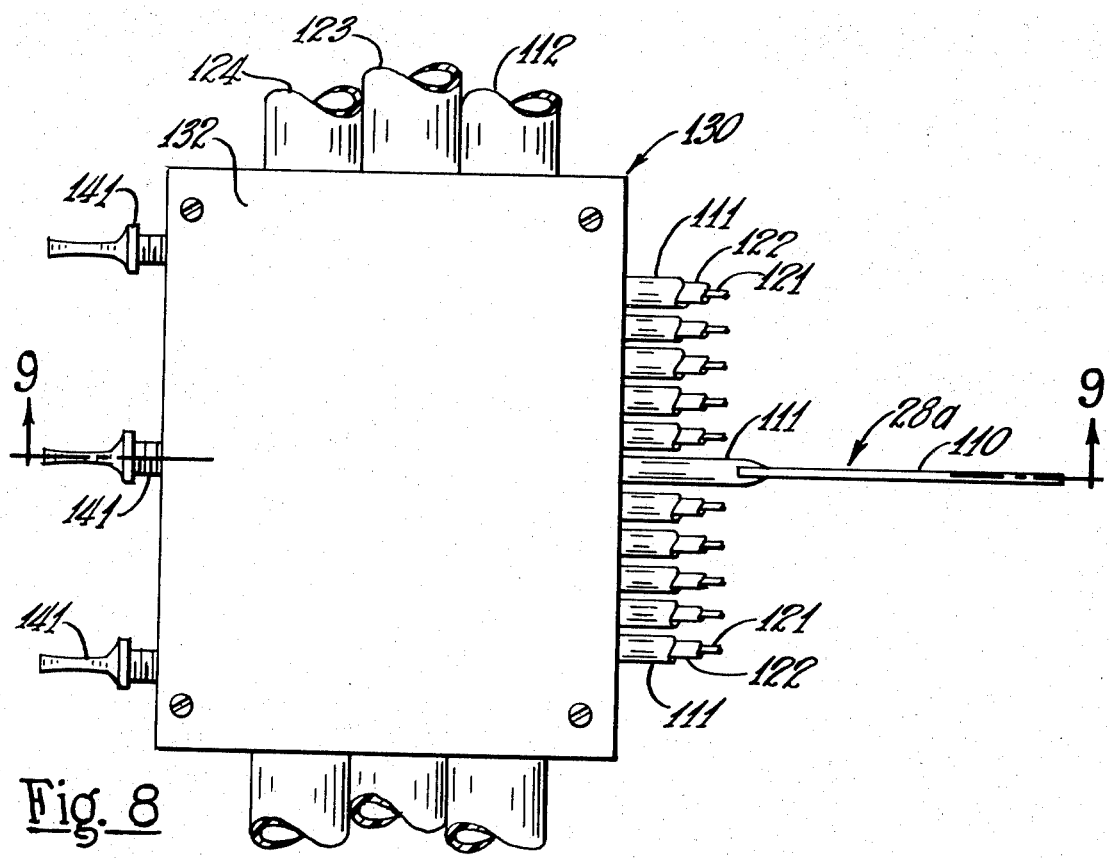
FIG. 8 is a plan view of a second embodiment of fin-shield structure illustrating the teachings of this invention.

Referring now to the drawings, FIG. 1 illustrates a portion of a refractory furnace 10 for reducing a body of glass to a molten condition and having a bushing or feeder 11 associated therewith from which a plurality of streams of glass are emitted from orifices in the feeder for attenuation into fibers 16. Fibers are gathered into a strand by drawing them over a gathering member 17 while sizing fluid is applied to the fibers by a roll-type applicator 18 which supplies a sizing to each filament above the point of collection at the gathering member 17. The strand 19 formed by the gathered fibers is packaged by a winder 20 which collects the strand on a tube 22 mounted on a rotating collet 23 and traversed by a suitable traversing device such as a spiral wire traverse 21. The winder 20 provides a force of attenuation for the fibers by reason of rotation of the collet which develops tension in each fiber to withdraw it from the molten glass flowing from the feeder.

The environmental control means generally indicated at 26 of the present invention provides a plurality of heat removing and gas emitting members in the form of shield units 28 each extending across the bottom of the feeder between a pair of rows of feeder tips 14, while each adjacent pair of such fin members has one or more rows of tips aligned therebetween. The orientation of the fins or shield units 28 across the under part of the feeder, with the feeder tips aligned therebetween may be seen in FIGS. 1 and 2 which illustrates that the tips 14 and the cones 12 emitted therefrom are, in effect, divided into crosswise pairs of rows.

The shield units 28 extend from a longitudinal header means 29 disposed laterally with respect to the feeder structure. A heat exchange medium, for example a liquid such as water, may be supplied to a conduit 29a formed in the header 29 from a supply 40 and returned to the supply via conduit 29d. The heat exchange medium supply 40 preferably includes means for cooling or otherwise removing heat from the circulating heat exchange medium. The medium in most cases can be a fluid such as water which is taken from a supply wherein the temperature is controlled. The medium may be any coolant which will provide the desired control. For example, a gas will suffice if properly cooled and circulated. A refrigerant may be expanded into the heat exchange area to effect cooling if more cooling capacity is required. The heat exchange medium may be circulated through shield structures 28 in a manner to be described hereinafter.

Conduit 29b may receive a first gaseous material from supply 50 via valve means 51 and/or pulser means 52. Similarly conduit 29c may receive a second gaseous material from supply 60 via valve means 61 and/or pulser means 62. The first and second gaseous materials may be supplied to shield structure 28 in a manner hereinafter to be described.

Referring to FIGS. 3 and 4 there is illustrated a first embodiment of the teachings of this invention in which the shield member structure 28 comprises a means 70 for conducting gas into the zone of attenuation between streams and means 80 for controlling the temperature of the gas before release in the attenuation zone which includes means for conducting a heat exchange medium from supply 40 in heat exchange relationship with the gas in the attenuation zone.

The gas conducting means includes gas conduit means 71 and the medium conducting means includes medium conduit means 81 disposed in heat exchange relationship adjacent the exterior of the gas conduit means 71. In this embodiment the gas conduit means 71 is disposed between two rows of orifices formed in the feeder and has outlet means 91 formed therein for releasing gas from the gas conduit 71 into the zone of attenuation of the streams.

The outlet means 91 may comprise a series of passages 92 formed in the conduit 71 along the upper side thereof. The series of passages 92 may be divided into two rows, each passage in one passage row preferably being formed in the conduit 71 at substantially a forty-five degree angle with respect to the plane defined by the orifice openings to direct gas to the other of said two orifices (best seen in FIGS. 5, 6 and 7). The two rows of passages 92 are separated and the medium conducting conduit means 81 is disposed between the passage rows and in contact with the gas conducting conduit 71.

The gas conduit means 71 may be divided into two chambers 72 and 73 by a barrier 74 as shown in FIG. 4. The barrier 74 may be formed by an insert as shown in FIG. 4, may be provided by crimping the conduit 71 together at an intermediate point, or the two chambers may be formed by two separate conduits, the equivalents being contemplated herein. The outlet means for the two-chambered gas conduit may include the first series of passages 92 hereinbefore discussed for chamber 72 and a similar series of passages 93 providing outlets for the chamber 73 along the lower edge of conduit 71.

The passages 92 direct gas from chamber 72 upwardly in the attenuation zone and may be utilized for applying a treating or plating gas adjacent the orifices of a feeder. The second series of passages 93 may be utilized to direct gas from the second chamber 73 downwardly in the attenuation zone and may provide the gaseous support discussed hereinbefore and stability for the lower portions of the cone and/or the filament being formed from a cone. The slight pulling effect of the downwardly directed gases on the bottom of the cone will stabilize the location of the cone.

The location of passages 93 on the lower part of the fin structure 28 also permits a cooling of the convection area of or adjacent to the cones. Particularly if longer cones are formed, as with certain types of molten glass, then the environment may be adjusted by the fin structures shown herein so that selected areas of the cone may be treated and/or cooled by properly locating the gas emitting passages.

The gas conduit 71 may be generally oval-shaped in cross section as shown in FIG. 4. The oval-shaped cross section is intended to represent and be equivalent to any other elongated cross section (such as rectangular) which provides a chamber or chambers for gas to be released in the attenuation zone, wherein the elongated cross section also provides physical separation of rows of cones for radiation shielding and in which the sides of the oval-shaped cross section are adapted to absorb heat in the manner discussed hereinbefore with respect to previously utilized fin-shield structures. The major axis of the oval-shaped gas conduit 70 is disposed substantially parallel to the streams issuing from the adjacent orifices.

The medium exchange conduit 81 may include a first section 82 disposed along the upper edge of the gas conduit 71, a section 83 disposed along the lower edge of the gas conduit 71, and a section 84 disposed around the closed end 76 of the gas conduit 71 which connects the sections 82 and 83 for series flow of the heat exchange medium. The ends of the medium exchange conduit 81 adjacent the header means 29 are thus adapted to receive and discharge a heat exchange medium from and to conduits 29a, 29d to flow through the connected sections 82, 83, 84 of the medium exchange conduit 81.

As best seen in FIG. 3, conduit sections 77 and 78 may receive gas from conduit means 29b and 29c in header 29 and pass the gas through the left side of the gas conduit 71 for distribution via passages 92, 93, the right end 76 of the gas conduit 71 being closed.

It is to be noted that the embodiment illustrated in FIGS. 3 and 4 may be utilized in several different manners. That is, the conduit 71 may be formed as a single chamber without the barrier 74. Thus a single gaseous mixture may be emitted only from 92, if passages 93 are not then formed therein, for plating and atmosphere control in the attenuation zone. Passages 93 may also be utilized in a single chamber embodiment so that a plating may be performed via passages 92 while a gaseous support may be formed from a gaseous mixture emitting from passages 93. Similarly, passages 92 may be blocked, or not formed in the first place, and passages 93 alone used for treatment of the cone and/or providing the gaseous support and stability described hereinbefore. If the barrier 74 is utilized to divide the conduit 71 into two chambers 72 and 73, then different gas mixtures may be supplied to chambers 72 and 73 via conduits 77 and 78, respectively, for performing different functions in the attenuation zone as discussed hereinbefore. Alternatively, higher pressures may obtain in one chamber over the other to perform different functions in different parts of the attenuation zone. Further, the gaseous mixture in one chamber may be pulsed while a continuous flow is provided from the other of the chambers. For example, it may be desirable to pulse gas in upper chamber 72 while providing a plating gas to the upper part of the attenuation zone, the pulsing preventing the deposition of volatiles and obstruction of the top of passages 92, while continuous flow from bottom passages 93 from chamber 73 would provide a physical stability for the filaments and the lower portion of the cones.

Experimentally there has been operation with a mixture of gases or layers of gases. In the first case, a combustible gas such as propane was diluted with inert gas until no combustion was possible. In the second case the inert gas was utilized to form an envelope below and around the combustible gas. In either case it was desirable to prevent flame which may burn off filaments.

In FIG. 1 the controls for the gas supplies 50 and 60 may be operated alternatively or in parrallel with each other. That is, the bypass valve 51 may be opened so that pulser 52 is inoperative. Alternatively, bypass valve 51 may be closed so that gas is supplied from pulser 52 in pulses or bursts. In a third mode of operation the valve 51 may supply a continuous flow of gas from supply 50 while pulser 52 is operative to add pulses of gas flow which are added onto the continuous flow. Thus the pulser 52 is operative to vary the velocity of the gas being released in the attenuation zone whether the velocity varies from zero magnitude to some predetermined level or whether the velocity varies from a predetermined base flow to some higher level.

Referring to FIGS. 5, 6 and 7 there are illustrated three types of feeders 11a, 11b and 11c with which the shield structure 28 of FIGS. 3 and 4 may be utilized as shown, and which may also be utilized with other embodiments of the fin structures of this invention.

In FIGS. 5 and 6 there are illustrated feeders 11a and 11b which have means 14a and 14b projecting from an under surface thereof for each group of orifices 15a and 15b, the orifices being formed in the projecting means 14a and 14b. Outlet means 92 in the fin-shield structure 28 are formed in the gas conduit 71 to release gaseous material adjacent the openings of each of the orifices on the under surface. The projecting means 14a and 14b may comprise a plurality of projecting tips. One orifice 15a may be formed in each tip 14a as illustrated in FIG. 5 or a plurality of orifices 15b may formed in each tip 14b as illustrated in FIG. 6.

The projecting means 14a and 14b are also illustrative as cross-sectional views of longitudinal ridges extending across the under surface of the feeder in a direction substantially parallel to an adjacent gas conduit. Orifices 15b thus then become representative of a plurality of rows of orifices formed in each of the longitudinal ridges. Orifices 15a are representative of a single row of orifices formed in each longitudinal ridge. In the embodiments illustrated in FIGS. 5 and 6 a section 82 of the medium conduit 81 is disposed on the upper side of the conduit 71 to afford temperature protection for conduit 71 and the gas therein by being interposed between the feeder 11 and the conduit 71. Further it will be noted in FIGS. 5 and 6 that the conduit section 82 may be disposed in a valley formed by the ridges 14a and 14b thus permitting the disposition of passages 92 more closely adjacent the orifice opening in the ridges or tips projecting from the under surface of a feeder.

Figure 11:
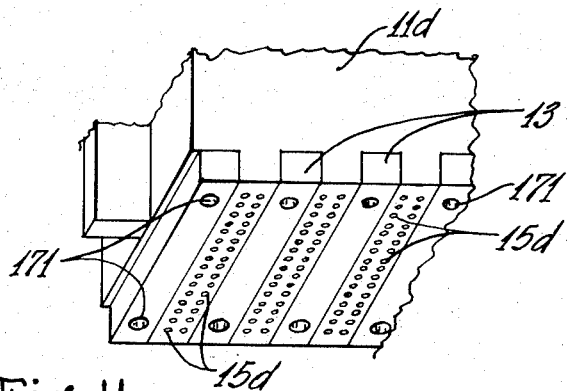
FIG. 11 is a perspective view of a feeder construction particularly suited for use with the embodiment of fin-shield structure illustrated in FIG. 10.

As noted in FIG. 11 inserts 13 may be supplied to fill the valleys formed between the ridges on the feeder 11d to define a substantially plane surface on the under surface of the feeder. The insert means may be formed from graphite to protect against accidental flooding or wet-out. By providing the inserts 13 as illustrated in FIG. 11 a substanially planar surface is achieved which is, for receiving a gas release in the upper portion of the attenuation zone, similar to a flat-plate feeder 11c as illustrated in FIG. 7. The orifices or groups of orifices formed either in the flat-plate feeder 11c illustrated in FIG. 7 or in the arrangement illustrated in FIG. 11 may be spaced comparatively close together since the gaseous mixture released from passages 92 may be utilized to plate the under surface of the feeder to prevent wetting and flooding. It thus becomes imperative to insure that the fin-shield structure 28 remains at a predetermined location with respect to the cones issuing from the orifices it is serving, than when larger or more widely spaced orifices in the feeder are being utilized.

Each gas conduit 71 and an associated heat exchange medium conduit 81 are preferably formed as integral parts of the unit 28. Male positioning and locating or indexing means 100 may be formed on one of the unit or feeder means while female positioning or indexing means 101 may be formed in the other of the unit or feeder means to receive the male positioning means. In FIG. 7 a stud-like extension or extensions 100 formed of or coated with a refractory or other insulating material may be formed on conduit section 82 and extend upwardly toward the feeder. A female positioning means such as aperture 101 may be formed in the feeder 11c to receive the male positioning means 100. The fin-shield unit is thus positively located with respect to an adjacent area of the feeder and will move with the feeder or the movement of the unit 28 will be restrained when the feeder and/or the fin-shield structure becomes heated and expansion of the system causes relative movement of the feeder 11 with respect to the fin-shield structure 28.

When a jet of cool gas strikes a tip directly it cools the metal and reduces glass flow. On the other hand, when the jet strikes only the glass cone the opposite appears to be true and the glass filament becomes larger. Therefore, the exact positioning of the shields become very important and indexing of the gas conduit-shields is desirable. This may be accomplished for any embodiment of this invention by the stud-aperture combination shown herein or other means for indexing the shield-conduit with respect to orifices.

Figure 9:
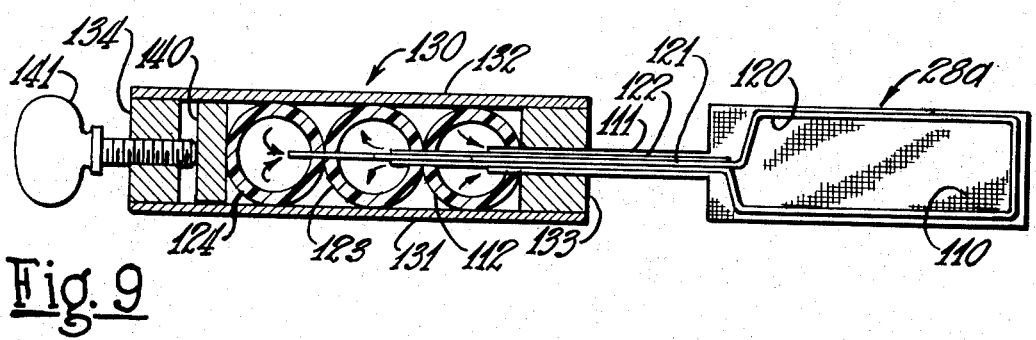
FIG. 9 is a cross-sectional view taken along lines 9—9 of the embodiment illustrated in FIG. 8.

Referring to FIGS. 8 and 9 there is illustrated a second embodiment of the teachings of this invention in which the gas conducting means includes a foraminous envelope 110 disposed to release gas in the attenuation zone and the heat exchange conducting means includes a medium conduit 120 disposed within the foraminous envelope 110.

The foraminous envelope 110 may be constructed from a metallic mesh which is designed to release gas in the desired quantities in the attenuation zone for plating of the feeder, treating of the cones, cooling of the cones or other effects desired. The mesh envelope may be constructed from stainless steel or other suitable material that will withstand the temperatures in the attenuating zone without changing the distribution qualities of the apertures in the mesh.

The gas conducting means includes a main gas supply conduit 112 and the heat exchange medium conducting means may include a main medium supply conduit 125. A housing 130 may carry the main supply conduits 112 and 124.

The gas conducting means further includes gas support conduit means 111 communicating with and extending between the main gas supply conduit 112 and the foraminous envelope 110.

The heat exchange medium conducting means further includes medium connecting conduit means 121 extending from the medium conduit 120 in the envelope 110 through the gas support conduit 111 to the main medium supply conduit 124.

The heat exchange medium conducting means may include a main medium return conduit 123 carried in the housing 130 and further include a connecting return conduit 122 extending from the medium conduit 120 in the envelope 110 to the medium main return conduit 123 in the housing 130. The medium connecting conduit 121 and the medium return conduit 122 may both extend through the gas support conduit 111. One of the medium connecting conduits and the medium return conduits 121, 122 may extend through the other of the connecting and return conduits as best illustrated in FIG. 9.

The main gas conduit 112, the main medium supply conduit 124 and the main medium return conduit 123 may be formed from puncturable materials adapted to receive the gas support conduit 111, the medium connecting conduit 121, and the medium return conduit 122 by insertion through the walls thereof, the supply conduit walls sealing around the support, connecting, and return conduits. The inside of the main conduits 112, 124, 123 may be coated with a laminar sealant similar to that used in automobile tires to perfect the seal around the conduits inserted therein, the sealant closing the punctures when the conduits are removed from the main conduits.

The housing 130 has upper and lower walls 132, 131 and side walls 133, 134 for confining the supply conduits 112, 123, 124 in side-by-side relationship. A movable wall means 140 and a threaded wing bolt 141 inserted in a tapped aperture formed in side wall 134 comprises means for urging the main supply conduits into positive contact with each other and the further side wall 133 of the housing 130. This holds the main supply conduits in a predetermined location within the housing 130 and assists in sealing the walls of the main conduits around the inserted support and connecting conduits, particularly when an internal sealant is not utilized in the main supply conduits as discussed above.

In making the main conduits 112, 123, 124 and wall 133 of plastic, rubber, or other insulating materials, each shield-conduit combination is electrically isolated from the others. This prevents inadvertently introduced electrical short circuits along the bushing or feeder. Further, indexing with stud-aperture or other combinations is possible without shorting out sections of the bushing.

Figure 10:
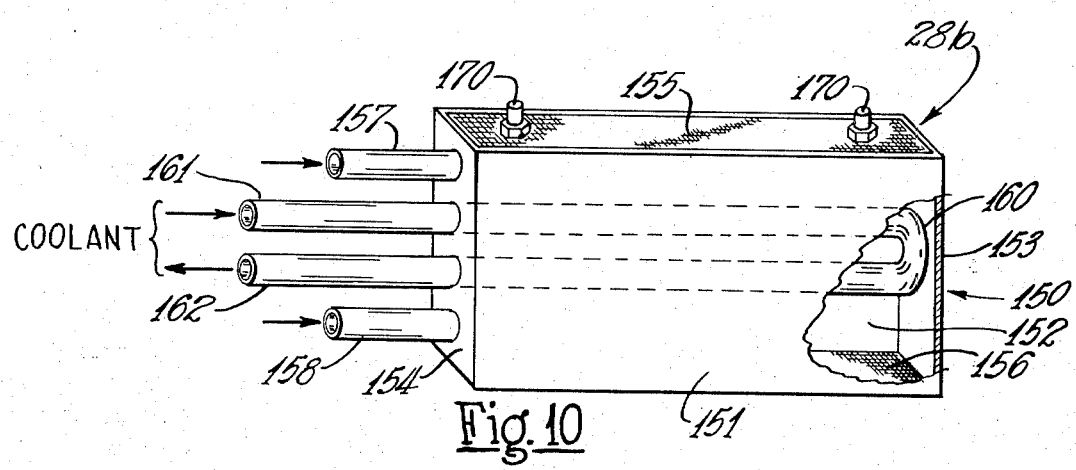
FIG. 10 is a view in perspective of a third embodiment of a fin-shield structure illustrating the teachings of this invention.

Referring to FIG. 10 there is illustrated a third embodiment of the teachings of this invention in the shield structure 28b in which the gas conducting means includes an elongated structure generally indicated at 150 for extension between two rows of orifices formed in the feeder. The structure 150 has gas impervious side walls 151, 152 and end walls 153, 154. The structure has upper and lower walls 155, 156, at least one of which is gas pervious.

The heat exchange medium conducting means includes medium conduit means 160 disposed in heat exchange relationship with gas within the elongated structure 150. The medium conduit means 160 may cooperate with the side and end walls of the elongated structure to form a gas barrier intermediate the upper and lower walls 155, 156 to divide the structure 150 into two gas chambers. If the multi-chamber structure is utilized both the upper and lower walls may be made gas pervious. Conduit means 157 may conduct a first gas to one of the chambers and conduit 158 may conduct a second gas to the other of said chambers formed in the structure 150. The upper and lower walls 155, 156, may be made gas pervious, by including gas diffusion screens as illustrated in FIG. 10 to diffuse a treating or cooling gas throughout the desired area of the attenuation zone. The apparatus of FIG. 10 then may function in a manner similar to that of the structure illustrated in FIGS. 3 and 4 with the exception that an alternative to the directionality of gas release via passages 93 in the apparatus of FIGS. 3 and 4 is provided by the gas diffuser screen 156 in the apparatus of FIG. 10.

The medium conduit 160 may be formed in a U-shape with the legs of the U extending through the side wall 154 permitting delivery and return of the heat exchange medium from one side of the elongated structure through coolant inlet and outlet conduits 161, 162. A header similar to that illustrated for use with the apparatus of FIGS. 3 and 4 may be utilized for distribution of one or more gases to the apparatus of FIG. 10 and to the delivery and discharge of heat exchange medium to the conduit 160.

As noted hereinbefore with respect to FIG. 7 the gas and heat exchange medium conducting means may be formed as parts of a unit 28b. Thus male positioning means such as stud means 170 may extend from the feeder 11d in FIG. 11 or the unit 28b while the other of the feeder and unit has aperture means 171 formed therein to receive the stud means 170. The stud means 170 and aperture means 171 cooperate as described hereinbefore to position the unit 28b relative to the feeder 11d and maintain that relative position through changes in dimension due to heating and cooling of the structures involved.

Figure 12:
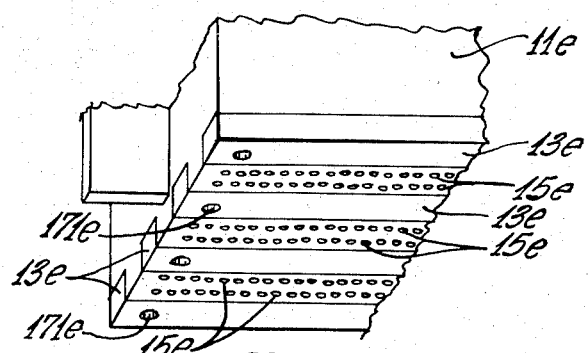
FIG. 12 is a perspective view of another feeder construction suitable for use with the various embodiments of fin-shield structures shown herein.

Referring to FIG. 12 there is illustrated an alternative structure of a feeder which is similar to that shown in FIG. 11 except that the projecting ridges (having orifices 15 formed therein) extend longitudinally along the long axis of the bushing rather than transverse to the long axis as in FIG. 11. The ridges may have inserts 13e located on each side thereof. Indexing or locating apertures 171e may be formed in the inserts 13e to receive indexing or locating pins mounted on the shield-conduit units. The shield-conduit units may be mounted longitudinally below the inserts or may be mounted transversely if the orifices 15e are spaced sufficiently far apart.

As noted hereinbefore graphite may be chosen for the inserts 13e. Graphite will not wet out or flood even if gas protection is lost for a short time, for example, when cleaning or adjusting. Normally the graphite will be protected against oxidation by the gas envelope. Graphite is desirable since it is easily cut to size. Other materials or composites may be used (such as a gold plated refractory) provided that the gas atmosphere coated them properly. Chrome oxide refractories tend to be non-wetting and may be used.

Inserts may be used for the following reasons: Ribbed orifice plates are stronger than flat orifice plates of the same metal requirement. The inserts fill the area between the ribs or projecting ridges and reduce the alloy requirement. Inserts provide a means for positioning or indexing shields, allowing the shields to move as the bushing expands or contracts. Deep forming sections aid in conditioning temperature of the glass. Glass just above the forming section can be kept at a higher temperature because of the gradient in the rib or ridge. Whether a flat plate or rib type feeder is desirable depends upon the particular glass being formed into fibers. Ribs or ridges formed along the long axis of the bushing do not draw excessive current. Carbon inserts have high resistance contacts with the feeder metal and thus do not affect the conductivity to any degree, acting more as an insulator.

There has thus been described hereinbefore various embodiments of apparatus for carrying out a method for producing filaments of heat-softenable material which comprises feeding streams of a molten form of the material from orifices formed in a feeder, attenuating the streams into filaments in an attenuation zone adjacent the feeder, releasing gaseous material into the zone of attenuation of the streams, and controlling the temperature of the gaseous materials in the attenuation zone before release. The temperature controlling step may include conducting a heat exchange medium in heat exchange relationship with the gaseous material in the attenuation zone. The gaseous material releasing step may include directing gaseous material toward orifices in the feeder. The gaseous material releasing step may further include directing gaseous material in the general line of travel of the attenuating filaments. The above gas releasing steps may be alone or in combination. The gas releasing step may further include varying the velocity of release of the gaseous material to improve the self-cleaning attributes of the structures hereinbefore described.

While I have herein shown and described particular embodiments of my invention, it will, of course, be understood that I do not wish to be limited thereto since many modifications may be made that will fall within the true spirit and scope of the invention.

I claim:

1. Apparatus for producing filaments of heat-softenable material comprising a feeder for feeding such material in molten form having orifices from which streams of such material flow, means for continuously attenuating the streams to fine filaments in an attenuation zone adjacent said feeder, means for conducting gas into the zone of attenuation between said streams, said gas conducting means having outlet means for releasing gas into said zone of attenuation of said streams, and means for controlling the temperature of said gas before release including means in said attenuation zone for conducting a heat exchange medium in heat-exchange relationship with said gas.

2. Apparatus as defined in claim 1 in which said gas conducting means includes gas conduit means disposed in said attenuation zone, and in which said medium conducting means includes medium conduit means disposed in heat-exchange relationship adjacent the exterior of said gas conduit means.

3. Apparatus as defined in claim 2 in which said gas conduit means is divided into two chambers, and in which said outlet means includes means for releasing a gas from each chamber into said attenuation zone.

4. Apparatus as defined in claim 3 in which said outlet means includes first passage means formed in said conduit for directing gas from a first of said chambers upwardly in said attenuation zone and further includes second passage means formed in said conduit for directing gas from a second of said chambers downwardly in said attenuation zone.

5. Apparatus as defined in claim 1 in which said gas conducting means includes a gas conduit extending between at least two orifices formed in said feeder, said gas conduit being oval-shaped in cross section, the major axis of said oval being disposed substantially parallel to the streams issuing from said orifices, said heat exchange medium conducting means including a medium exchange conduit disposed along an upper edge of said gas conduit and a medium exchange conduit disposed along a lower edge of said gas conduit.

6. Apparatus as defined in claim 1 which further includes means for delivering a pulsating supply of gas to said gas conducting means.

7. Apparatus as defined in claim 1 in which said gas conducting means includes a foraminous envelope disposed to release gas in said attenuation zone, and in which said heat exchange conducting means includes a medium conduit disposed within said foraminous envelope.

8. Apparatus as defined in claim 7 in which said gas conducting means includes a main gas supply conduit and in which said heat exchange medium conducting means includes a main medium supply conduit, and a housing for carrying said main supply conduits, said gas conducting means further including gas support conduit means communicating with and extending between said main gas supply conduit and said foraminous envelope, said heat exchange medium conducting means further including medium connecting conduit means extending from said medium conduit in said envelope through said gas support conduit to said main medium supply conduit.

9. Apparatus as defined in claim 8 in which said main gas and said main medium supply conduits are formed from puncturable materials adapted to receive said support and connecting conduits by insertion through walls of said supply conduits, said supply walls sealing around said support and connecting conduits, said medium connecting conduit extending on from the end of said support conduit through a wall of said main gas supply conduit and a wall of said main medium supply conduit into the interior thereof.

10. Apparatus as defined in claim 8 in which said heat exchange medium conducting means further includes a medium main return conduit carried in said housing, and which further includes a connecting return conduit extending from said medium conduit in said envelope to said medium main return conduit through said gas support conduit.

11. Apparatus as defined in claim 1 in which said gas conducting means includes an elongated structure extending between two rows of orifices formed in said feeder, said structure having gas impervious side and end walls, said structure also having upper and lower walls at least one of which is gas pervious, said heat exchange medium conducting means including medium conduit means disposed in heat exchange relationship with gas within said elongated structure.

12. Apparatus as defined in claim 11 in which said medium conduit means cooperates with said side and end walls of said elongated structure to form a gas barrier, said barrier being formed intermediate said upper and lower walls dividing said elongated structure into two chambers, both said upper and lower walls being gas pervious.

13. Apparatus as defined in claim 1 in which said gas and said heat exchange medium conducting means are formed as parts of a unit, stud means extending from one of said feeder and said unit, the other of said feeder and said unit having aperture means formed therein to receive said stud means, said stud means and aperture means cooperating to position said unit relative to said feeder and maintain that relative position.

14. Apparatus for producing glass filaments comprising a feeder for feeding glass in molten form having orifices from which streams of molten glass flow, means for continuously attenuating the streams to fine filaments in an attenuation zone immediately adjacent said feeder, said feeder orifices being arranged in a pattern made up of rows of said orifices, means for conducting gas into the zone of attenuation between said streams including a series of gas conduits extending in side-by-side relationship in said attenuation zone to subdivide the total number of streams emitted from said orifices into smaller groups within said zone, said gas conduits also being aligned so that each of the streams emitted from said rows of orifices has at least one of said conduits extending in immediately adjacent relationship therewith, each of said gas conduits having outlet means formed therein for releasing gaseous material into said zone of attenuation of said streams, and means for controlling the temperature of said gaseous material before release including means for conducting a heat exchange medium in said attenuation zone in heat-exchange relationship with said gaseous material.

15. Apparatus as defined in claim 14 in which said feeder has means projecting from an under surface thereof for each group of orifices, said orifices being formed in said projecting means, said outlet means formed in each of said gas conduits being located to release gaseous material adjacent the openings of each of said orifices on the under surface.

16. Apparatus as defined in claim 15 in which said projecting means for each group comprises a longitudinal ridge extending across the under surface of said feeder in a direction substantially parallel to an adjacent gas conduit.

17. Apparatus as defined in claim 16 in which said heat exchange medium conducting means includes a medium conduit disposed on an upper side of each of said gas conduits, said medium conduit being disposed in a valley formed by said ridges.

18. Apparatus as defined in claim 16 which further includes means inserted to fill valleys formed by said ridges to define a substantially plane surface.

19. Apparatus as defined in claim 18 in which said insert means are substantially non-conductive electrically 20. Apparatus as defined in claim 18 in which each said gas conduit and an associated heat exchange medium conducting means are formed as integral parts of a unit, male positioning means formed on one of each said unit and insert means, female positioning means formed in the other of each unit and insert means to receive said male positioning means.

21. Apparatus as defined in claim 14 in which an undersurface of said feeder has said orifices formed therein, said under surface defining a substantially plane surface to receive gaseous material released from said gas conduits, each said gas conduit being formed as an integral part of a unit with means for conducting a medium in heat exchange therewith, male positioning means formed on one of each said unit and an adjacent area of said feeder, and female positioning means for receiving said male means formed in the other of each said unit and adjacent area of said feeder to maintain a predetermined relative spacing of each said unit with respect to the feeder.

22. Apparatus as defined in claim 14 which further includes means for dividing each gas conduit into two chambers, said gaseous releasing means comprising first means for releasing gaseous material from a first of said chambers into an upper portion of said attenuation zone and second means for releasing gaseous material from a second of said chambers into a lower portion of said attenuation zone.

23. A method for producing filaments of glass comprising feeding streams of a molten form of the glass from orifices formed in a feeder, attenuating said streams into filaments in an attenuation zone adjacent said feeder, conducting gaseous material into the zone of attenuation of said streams and releasing said gaseous material adjacent said streams, and controlling the temperature of said gaseous material in said attenuation zone before release into the zone of attenuation by conducting a heat exchange medium in heat exchange relationship with said gaseous material in said attenuation zone before release of said gaseous material into said zone.

24. A method as defined in claim 23 in which said releasing step includes directing a first gaseous material toward said orifices and directing a second different gaseous material along the line of travel of the filaments.

25. A method as defined in claim 23 in which said releasing step includes varying the velocity of release of said gaseous material.

26. A method for producing glass filaments comprising feeding streams of molten glass from orifices formed in a feeder, attenuating said streams into filaments in an attenuation zone below said feeder, releasing a first gaseous material into the upper portion of said attenuation zone to assist in the fiber forming, and releasing a second gaseous material into the lower portion of said attenuation zone to form an envelope around said first gaseous material and assist in maintaining a pocket of said first gaseous material in said upper portion of said zone.

27. A method as defined in claim 26 in which said first gaseous material comprises a combustible gas released to prevent wetting out of feeder surfaces adjacent said orifices and in which said second gaseous material comprises an inert gas released to prevent said combustible gas from burning off filaments.

28. A method of producing glass fibers comprising issuing streams of molten glass from orifices formed in a feeder and arranged in a pattern made up of rows of said orifices, attenuating said streams into fibers in an attenuation zone immediately adjacent said feeder, conducting gaseous material into the zone of attenuation between said rows of streams in gas conduits so that each of the streams has gas conducted in immediately adjacent relationhip therewith, releasing said gaseous material into said zone of attenuation from outlet means formed in said conduits adjacent said streams, and controlling the temperature of said gaseous material before release by conducting a heat exchange medium in heat-exchange relationship with said gaseous material in said attenuation zone.

29. A method as defined in claim 28 in which said temperature controlling is effected by conducting said medium in heat exchange relationship with the exterior of said gaseous conduits.

30. A method as defined in claim 28 in which said temperature controlling is effected by conducting said medium in heat-exchange relationship with said gaseous material on the interior of said gaseous conduits.

31. Apparatus for producing glass filaments, comprising:
  (a) a feeder having at least one orifice formed therein for issuing a stream of glass from a molten body of glass constrained by the feeder,
  (b) means for attenuating the stream of glass into a fine filament in an attenuation zone adjacent said orifice in said feeder,
  (c) means for conducting gas into said zone of attenuation adjacent said feeder including gas conduit means having outlet means for releasing gaseous material into the zone of attenuation of said stream, and
  (d) means for controlling the temperature of said gaseous material before release including means for conducting a heat exchange medium in heat exchange relationship with said gaseous material in said attenuation zone.

References Cited
UNITED STATES PATENTS

| | | | |
|---|---|---|---|
| 2,632,287 | 3/1953 | Phillips | 65—12 |
| 3,256,078 | 6/1966 | Drummond | 65—12 X |
| 3,257,181 | 6/1966 | Stalego | 65—12 X |

ROBERT L. LINDSAY Jr., Primary Examiner

U.S. Cl. X.R.

65—11 W, 12; 264—176 F